US006612704B2

United States Patent
Ogawa

(10) Patent No.: US 6,612,704 B2
(45) Date of Patent: Sep. 2, 2003

(54) REFLECTION TYPE IMAGE FORMING OPTICAL SYSTEM AND PROJECTOR

(75) Inventor: Jun Ogawa, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/315,031

(22) Filed: Dec. 10, 2002

(65) Prior Publication Data

US 2003/0107716 A1 Jun. 12, 2003

(30) Foreign Application Priority Data

Dec. 12, 2001 (JP) ........................................ 2001-378297

(51) Int. Cl.[7] .............................................. G03B 21/28
(52) U.S. Cl. .......................... 353/99; 359/858; 359/859; 359/861
(58) Field of Search .............................. 353/98, 99, 77, 353/78, 79; 359/850, 853, 857, 858, 859, 861

(56) References Cited

U.S. PATENT DOCUMENTS

| 5,245,369 A | * | 9/1993 | Um et al. ..................... 353/122 |
| 5,379,080 A | * | 1/1995 | Onozuka ...................... 353/37 |
| 5,477,394 A | * | 12/1995 | Shibazaki .................... 359/858 |
| 6,513,935 B2 | * | 2/2003 | Ogawa ......................... 353/37 |

FOREIGN PATENT DOCUMENTS

| JP | 10-111458 A | 4/1998 |
| WO | WO97/01787 A1 | 1/1997 |

* cited by examiner

Primary Examiner—William Dowling
(74) Attorney, Agent, or Firm—Sughrue Mion, PLLC

(57) ABSTRACT

A reflection type image forming optical system and a projector are compact with wide view angle, in expensive and having uniform illumination intensity. The reflection type image forming optical system includes a first reflection mirror having a rotation symmetric aspheric shape concave reflection surface directed to an image forming surface arranged an image forming element thereon, a second reflection mirror having a rotation symmetric aspheric shape convex reflection surface directed toward a flux of light from the first reflection mirror, a third reflection mirror having a rotation symmetric aspheric shape concave reflection surface directed toward a flux of light from the second reflection mirror and a fourth reflection mirror having a rotation symmetric aspheric shape convex reflection surface directed toward a flux of light from the third reflection mirror. The first, second, third and fourth reflection mirrors form a telecentric optical system.

9 Claims, 11 Drawing Sheets

⊕ : IF LIGHT BEAM PROPAGATE TOWARD RIGHT

⊖ : IF LIGHT BEAM PROPAGATE TOWARD LEFT

FIG. 7B

| No. | IMAGE FORMING ELEMENT 0 | FIRST REFLECTION MIRROR 1 | SECOND REFLECTION MIRROR 2 | THIRD REFLECTION MIRROR 3 | FOURTH REFLECTION MIRROR 4 |
|---|---|---|---|---|---|
| r |  | 84.64 | 74.122 | 150.723 | 30.657 |
| dj | $d_0 = 70.234$ | $d_1 = 67.234$ | $d_2 = 75.583$ | $d_3 = 71.515$ | $d_4 = 247.042$ |
| k |  | -0.131 | 0.958 | -0.059 | -3.258 |
| $\alpha 1$ |  | 0 | 0 | 0 | 0 |
| $\alpha 2$ |  | $4.1283 \times 10^{-8}$ | $4.15752 \times 10^{-7}$ | $-3.15767 \times 10^{-7}$ | $-8.07737 \times 10^{-8}$ |
| $\alpha 3$ |  | $-3.3103 \times 10^{-11}$ | $2.20018 \times 10^{-19}$ | $2.39232 \times 10^{-11}$ | $5.94465 \times 10^{-12}$ |
| $\alpha 4$ |  | $2.14459 \times 10^{-13}$ | $4.58036 \times 10^{-12}$ | $-1.33999 \times 10^{-15}$ | $-2.87113 \times 10^{-16}$ |
| $\alpha 5$ |  | $-4.16442 \times 10^{-16}$ | $-1.41936 \times 10^{-14}$ | $4.03789 \times 10^{-20}$ | $8.88965 \times 10^{-21}$ |
| $\alpha 6$ |  | $2.89016 \times 10^{-19}$ | $1.66465 \times 10^{-17}$ | $-5.96503 \times 10^{-25}$ | $-1.57516 \times 10^{-25}$ |
| $\alpha 7$ |  | 0 | 0 | 0 | $1.21196 \times 10^{-30}$ |
| X |  | 0 | 0 | 0 | 0 |
| Y | 0 | 13.163 | 15.81 | 21.656 | 23.126 |
| a |  | -1.22 | 1.573 | 1.354 | -0.544 | r : CURVATURE RADIUS
dj : DISTANCE BETWEEN SURFACES (DISTANCE AS MEASURED DISTANCE BETWEEN ORIGINS OF COORDINATES DEFINING CURVATURES OF RESPECTIVE SURFACES IN PARALLEL TO OPTICAL AXIS)
k : CONICAL COEFFICIENT
$\alpha 1$ TO $\alpha 7$ : CORRECTION COEFFICIENT
X : DISTANCE MEASURED THE ORIGIN OF COORDINATE DEFINING CURVATURE OF EACH SURFACE FROM OPTICAL AXIS ALONG X AXIS DIRECTION (DISTAL DIRECTION FROM SHEET SURFACE IN DRAWING)
Y : DISTANCE MEASURED THE ORIGIN OF COORDINATE DEFINING CURVATURE OF EACH SURFACE FROM OPTICAL AXIS ALONG Y AXIS DIRECTION (PERPENDICULAR DIRECTION IN DRAWING)
a : ROTATION ANGLE OF y-x PLANE ABOUT x AXIS

REFLECTION TYPE IMAGE FORMING OPTICAL SYSTEM AND PROJECTOR

BACKGROUND OF THE INVENTION

1. Field of the Invention

The present invention relates to a projector and an image forming optical system having an image forming element represented by a liquid crystal or DMD (Digital Micromirror Device: trademark of Texas Instrument Inc.)

2. Description of the Related Art

In the recent years, there has been appearing devices for enlarged projection by means of a liquid crystal projector or DMD (Digital Micromirror Device) projector, in place of CRT projector in a projector market. Among the projectors, in case of a rear projector projecting an image from back surface of the screen, there is a progressively increasing demand for reducing thickness and weight in constructional nature. On the other hand, even in case of a front type projector, associating spreading to domestic use, it is becoming necessary to permit enlarged projection even in a small room. There is increasing demand for wide view angle to obtain large screen even by enlarged projection at small distance.

As an approach for enlarged projection at small distance and widened view angle of the projector, the projector employing the reflection type image forming optical system has been disclosed in WO97/01787 (PCT/JP96/01767) and Japanese Unexamined Patent Publication No. 10-111458. The reflection type image forming optical system, such as those employed in the projector disclosed in the above-identified publications, generally has various advantages, such as (1) having no chromatic aberration, (2) having capability of reduction of thickness and size for capability of bending of an optical path, (3) capability of obtaining small internal reflection and high contrast, and (4) having capability of high resolution in simple construction. Therefore, various forms of the reflection type image forming optical systems have been proposed.

Among number of reflection type image forming optical systems, one example of the optical type image forming optical system which the inventors have proposed in the past, is illustrated in FIG. 10. FIG. 10 is a general illustration of a projector which is constructed with an illuminating optical system 1, a reflection type image forming element (or image pick-up element) 2 and a reflection type image forming optical system. The reflection type image forming element 2 is arranged on an image forming surface of the reflection type image forming optical system. The reflection type image forming optical element in FIG. 10 is constructed with a first reflection mirror 3a having a concave surface directed to an image forming surface (reflection type image forming element 2) and having a free-curved surface shape, a second reflection mirror 3b having a convex surface directed to a flux of light from the first reflection mirror and having a free-curved surface shape, a third reflection mirror 3c having a convex surface directed to a flux of light from the second reflection mirror and having a free-curved surface shape, and a fourth reflection mirror 3d having a concave surface directed to a flux of light from the third reflection mirror and having a rotation symmetric aspheric shape, arranged in sequential order from the side of the reflection type image forming element 2.

When the reflection type image forming optical system of FIG. 10 is employed in the projector or the enlarged projection type display apparatus, since the shapes of the reflection surfaces of the reflection mirrors forming the reflection type image forming optical system are a free-curved surface shape, there is severe condition in precision in manufacturing and precision in assembling to the enlarged projection type display apparatus.

SUMMARY OF THE INVENTION

The present invention has been worked out in view of the shortcoming in the prior art set forth above. Therefore, it is an object of the present invention to provide a reflection type image forming optical system and a projector which is compact with wide view angle, in expensive and having uniform illumination intensity.

According to the first aspect of the present invention, a reflection type image forming optical system comprises:

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape concave reflection surface directed toward a flux of light from the second reflection mirror; and a fourth reflection mirror having a rotation symmetric aspheric shape convex reflection surface directed toward a flux of light from the third reflection mirror;

the first, second, third and fourth reflection mirrors forming a telecentric optical system.

According to the second aspect of the present invention, a reflection type image forming optical system comprises:

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape convex reflection surface directed toward a flux of light from the second reflection mirror; and a fourth reflection mirror having a rotation symmetric aspheric shape convex reflection surface directed toward a flux of light from the third reflection mirror;

the first, second, third and fourth reflection mirrors forming a telecentric optical system.

In the preferred construction, the shapes of the reflection surfaces of the reflection mirrors forming the reflection type image forming optical system satisfies the following formulae (1) to (3) taking an optical axis as z axis, a plane perpendicular to the z axis as x-y plane, an intersection between the z axis and the x-y plane as origin O, and axes intersecting at the origin O, extending on the x-y plane and perpendicularly intersecting with each other as x axis and y axis:

$$z = \frac{c\rho^2}{1 + \sqrt{1 - (1+k)c^2\rho^2}} + \sum_{i=1}^{8} \alpha_i \rho^{2i} \quad (1)$$

-continued $$\rho^2 = x^2 + y^2 \qquad (2)$$

$$c = 1/r \qquad (3)$$

wherein $\alpha_i$ (i=1, 2, . . . , 8) are correction coefficients, r is a curvature radius of the reflection surface and k is conical coefficient.

According to the third aspect of the present invention, a projector comprises:

a telecentric illumination optical system having a light source and an image forming optical system;

a reflection type image forming element arranged on an image forming surface of the telecentric illumination optical system; and a telecentric reflection type image forming optical system locating an image forming surface at an arrangement position of the reflection type image forming element and reflecting and projecting a flux of light reflected by the reflection type image forming element on a screen, the reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape concave reflection surface directed toward a flux of light from the second reflection mirror; and a fourth reflection mirror having a rotation symmetric aspheric shape convex reflection surface directed toward a flux of light from the third reflection mirror.

According to the fourth aspect of the present invention, a projector comprises:

a telecentric illumination optical system having a light source and an image forming optical system;

a reflection type image forming element arranged on an image forming surface of the telecentric illumination optical system; and a telecentric reflection type image forming optical system locating an image forming surface at an arrangement position of the reflection type image forming element and reflecting and projecting a flux of light reflected by the reflection type image forming element on a screen, the reflection type image forming optical system including;

a first reflection mirror having a rotation symmetric aspheric shape concave reflection surface directed to-an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape convex reflection surface directed toward a flux of light from the second reflection mirror; and a fourth reflection mirror having a rotation symmetric aspheric shape convex reflection surface directed toward a flux of light from the third reflection mirror.

According to the fifth aspect of the present invention, a projector comprises:

a telecentric illumination optical system having a light source and an image forming optical system;

a transmission type image forming element arranged on an image forming surface of the telecentric illumination optical system; and a telecentric reflection type image forming optical system locating an image forming surface at an arrangement position of the transmission type image forming element and reflecting and projecting a flux of light passed through the transmission type image forming element on a screen, the reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape concave reflection surface directed toward a flux of light from the second reflection mirror; and a fourth reflection mirror having a rotation symmetric aspheric shape convex reflection surface directed toward a flux of light from the third reflection mirror.

According to the sixth aspect of the present invention, a projector comprises:

a telecentric illumination optical system having a light source and an image forming optical system;

a transmission type image forming element arranged on an image forming surface of the telecentric illumination optical system; and a telecentric reflection type image forming optical system locating an image forming surface at an arrangement position of the transmission type image forming element and reflecting and projecting a flux of light passed through the transmission type image forming element on a screen, the reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from the first reflection mirror;

a third reflection mirror having a rotation symmetric aspheric shape convex reflection surface directed toward a flux of light from the second reflection mirror; and a fourth reflection mirror having a rotation symmetric aspheric shape convex reflection surface directed toward a flux of light from the third reflection mirror.

The shape of the reflection surface of the reflection mirror forming the reflection type image forming optical system of the projector is rotation symmetric aspheric shape expressed by the foregoing formulae (1) to (3).

In the projector set forth above, the depth of the projector can be reduced by providing a light path converting element represented by a reflection mirror, prism and so forth in the illumination optical system in the projector.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 7A and 7B are illustrations showing positional relationship of each reflection mirror and each parameter of shape of the reflection mirror;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
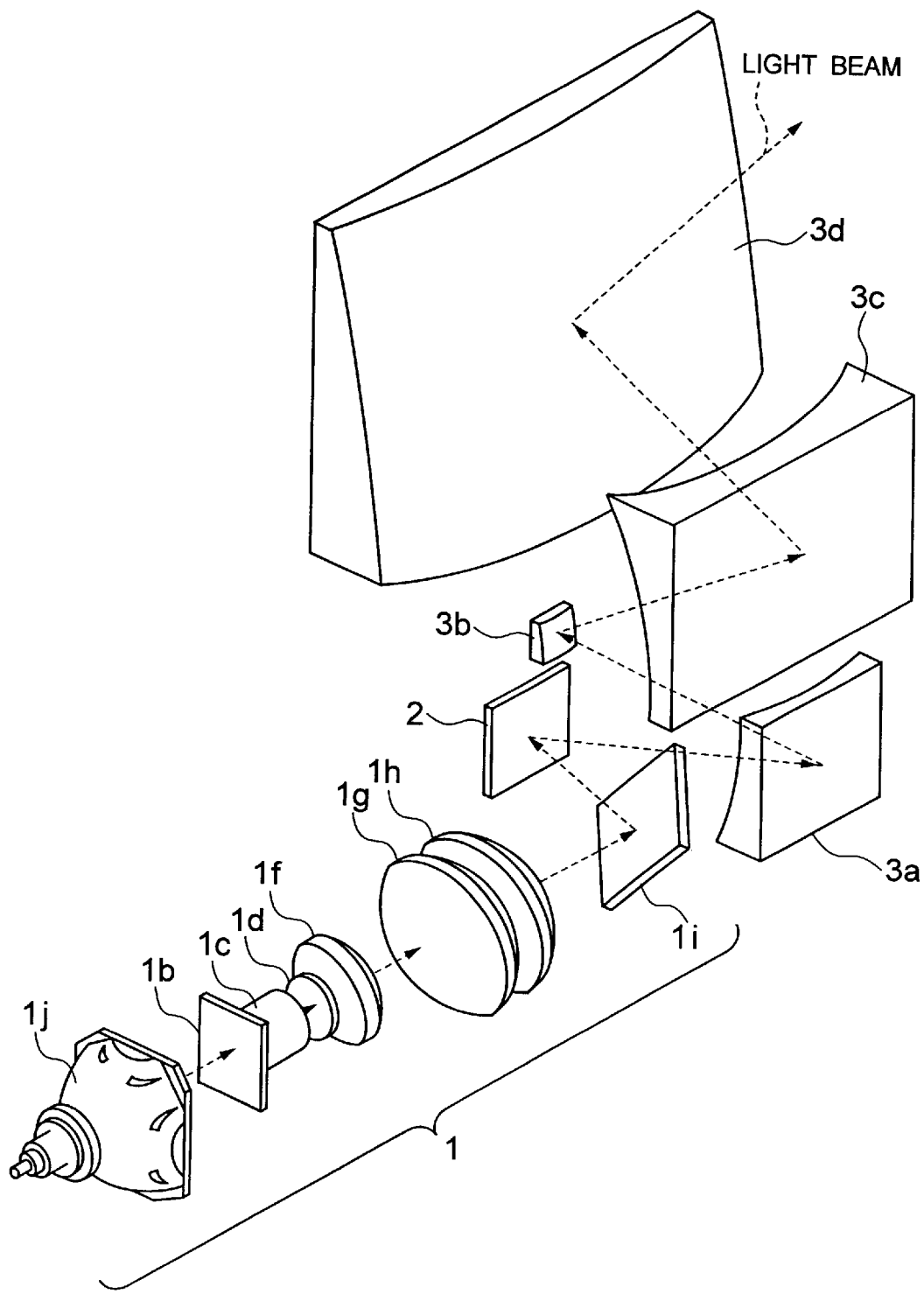
FIG. 1 is a perspective view of one embodiment of the present invention.
Figure 2:
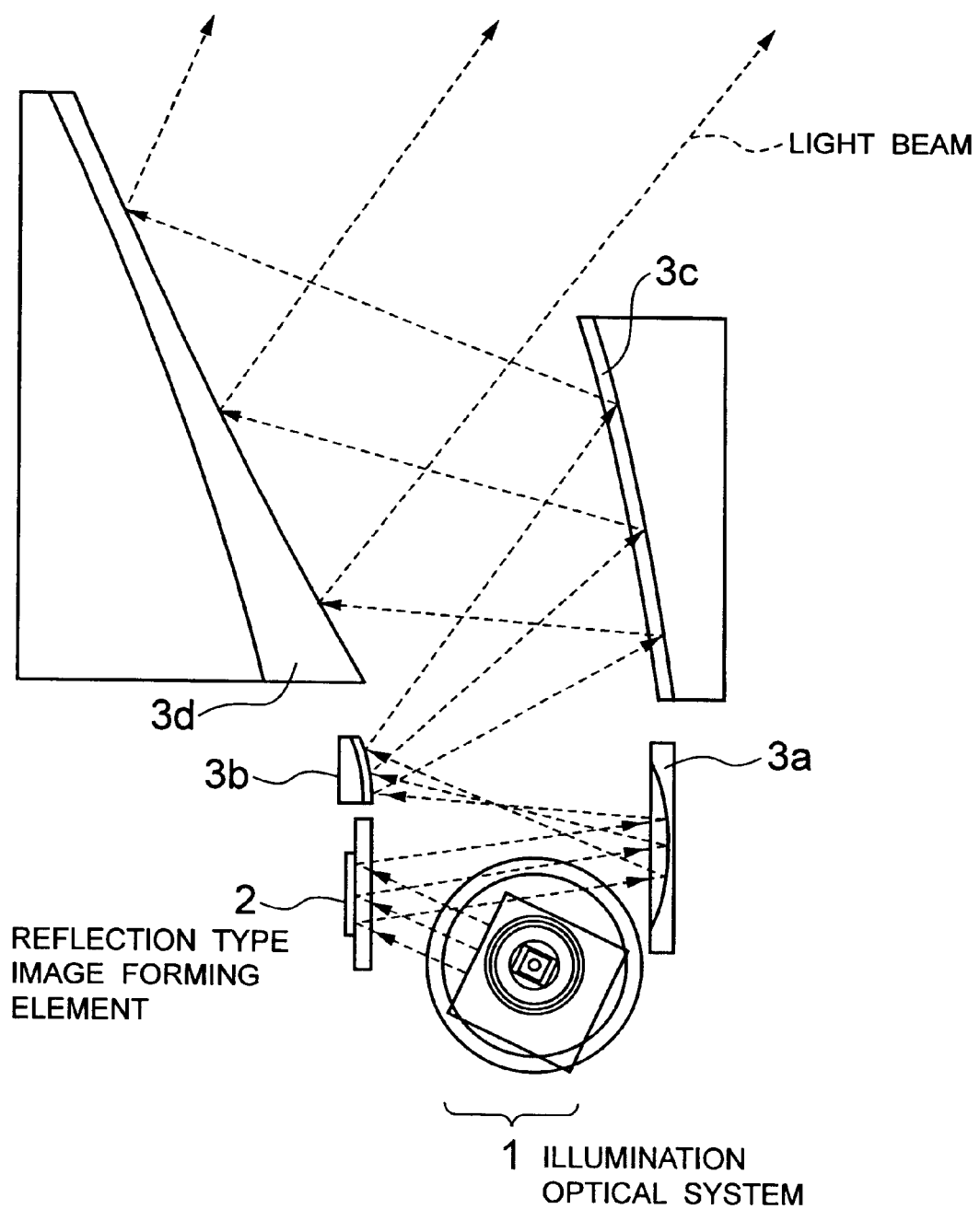
FIG. 2 is a side elevation of one embodiment of the present invention.
Figure 3:
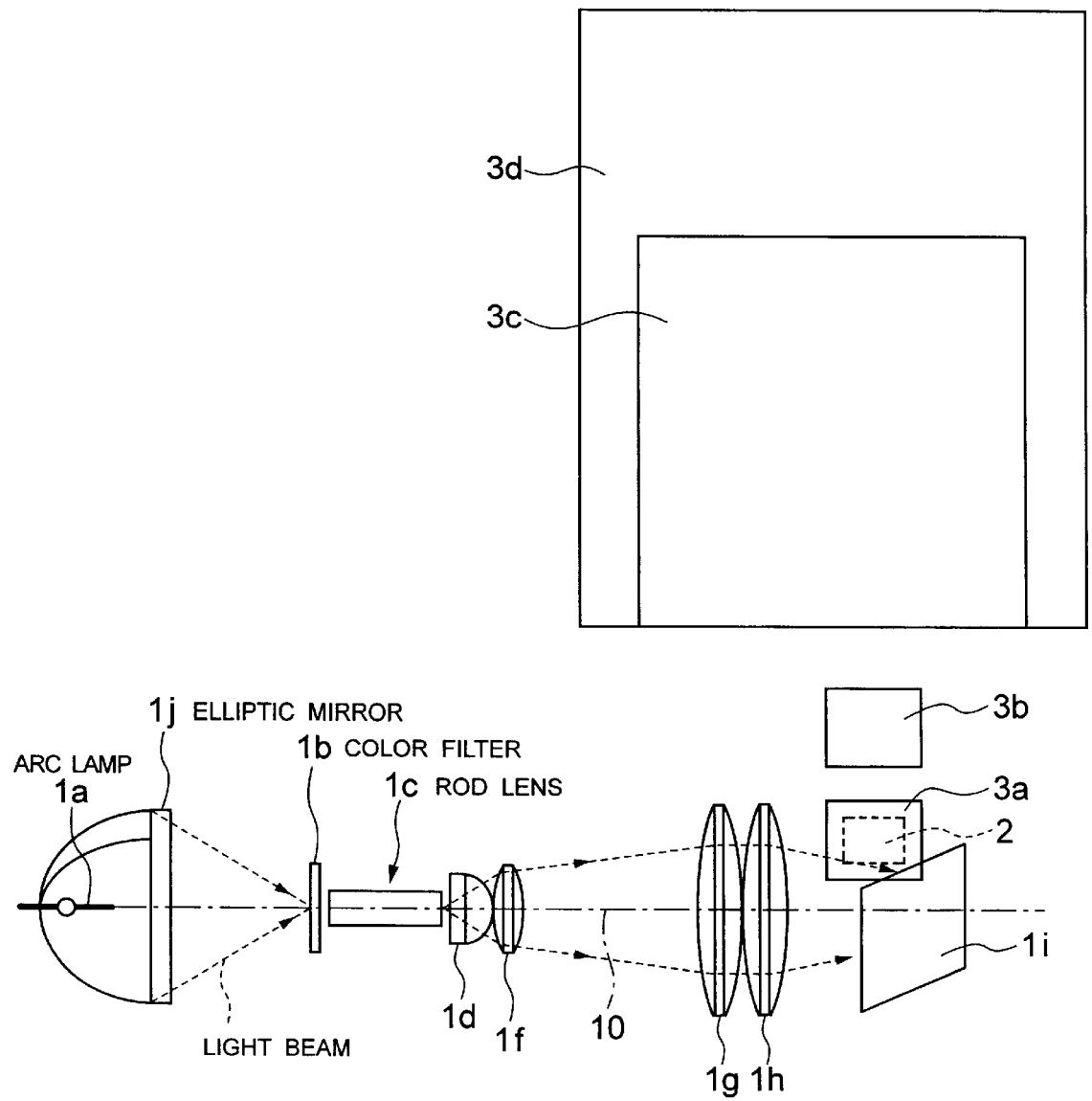
FIG. 3 is a front elevation of one embodiment of the present invention.
Figure 4:
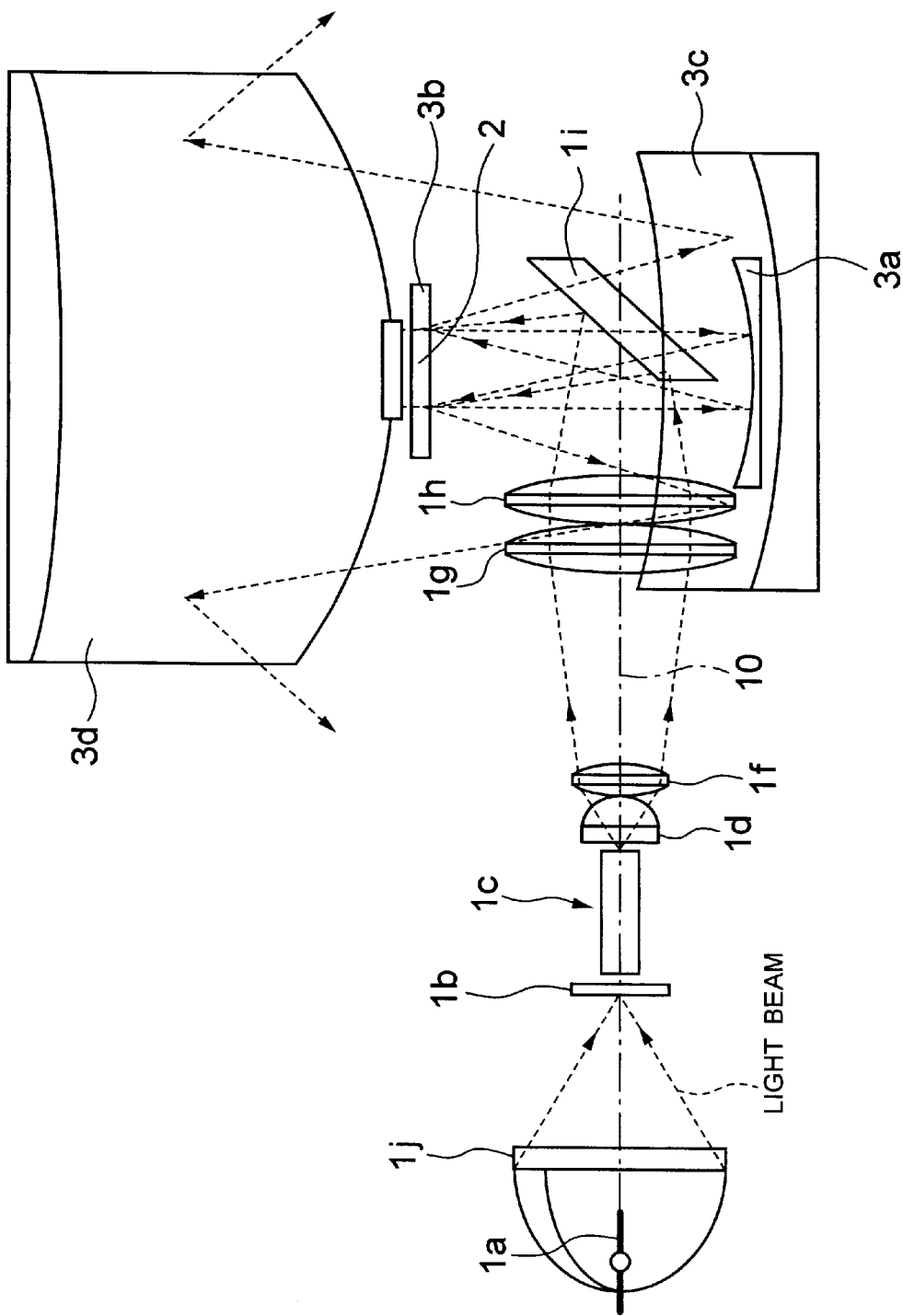
FIG. 4 is a top plan view of one embodiment of the present invention.

A reflection type image forming optical system according to the present invention is illustrated in FIGS. 1 to 4. FIG. 1 is a perspective view, FIG. 2 is a side elevation, FIG. 3 is a front elevation (as viewed from right side of FIG. 2) and FIG. 4 is a top plan view of a projector constructed by combining a reflection type image forming element and an illumination optical system to a reflection type image forming optical system.

Referring to FIGS. 1 to 4, the reflection type image forming optical system is constructed with four reflection mirrors including a first reflection mirror 3a having a concave reflection surface of rotation symmetric aspheric shape, a second reflection mirror 3b having a rotation symmetric aspheric shaped convex reflection surface directed to a flux of light from the first reflection mirror, a third reflection mirror 3c having a rotation symmetric aspheric shaped concave reflection surface directed to a flux of light from the second reflection mirror and a fourth reflection mirror 3d having a rotation symmetric aspheric shaped convex reflection surface to the flux of light from the third reflection mirror. The reflection mirrors are arranged to form zigzag path of the flux of light by reflecting the light beam in sequential order of reflection mirrors 3a, 3b, 3c and 3d. The flux of light reflected by the fourth reflection mirror 3d is projected on a projection screen (not shown) in enlarged fashion. On an image forming surface of the reflection type image forming system, a reflection type image forming element 2 which is formed of a liquid crystal element or DMD, is arranged to form a telecentric optical system.

Figure 5:
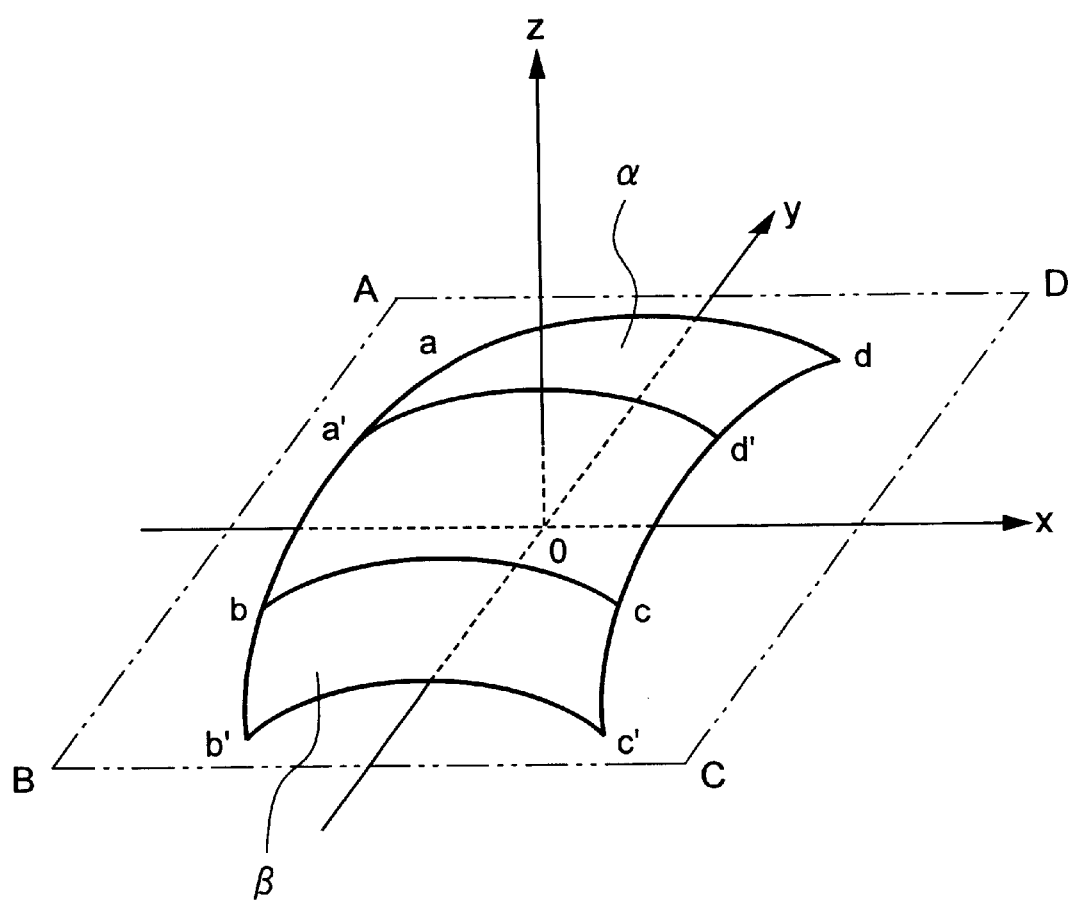
FIG. 5 is an illustration showing a relationship between a shape of a reflection mirror and a coordinate axis.

The shape of the reflection surface (the rotation symmetric aspheric shape) of the reflection surfaces 3a to 3d is a shape satisfying the following formulae (1) to (3) taking coordinate axes as shown in FIG. 5, wherein an optical axis is taken as z axis, a plane perpendicular to the z axis is taken as x-y plane (a plane defined by four points A, B, C and D), an intersection between the z axis and the x-y plane is taken as an origin O, and axes intersecting at the origin O, extending on the x-y plane and perpendicularly intersecting with each other are taken as x axis and y axis.

$$z = \frac{c\rho^2}{1 + \sqrt{1 - (1+k)c^2\rho^2}} + \sum_{i=1}^{8} \alpha_i \rho^{2i} \quad (1)$$

$$\rho^2 = x^2 + y^2 \quad (2)$$

$$c = 1/r \quad (3)$$

wherein $\alpha_i$ (i=1, 2, ..., 8) are correction coefficients, r is a curvature radius of the reflection surface and k is conical coefficient.

The reflection mirrors having shapes of the reflection surfaces satisfying the foregoing formulae may be either a reflection mirror taking a curved surface α (curved surface defined by points a, b, c and d) (see FIG. 5) in which the z axis extends across the center thereof, as reflection surface, or so-called offset type curved surface β (curved surface defined by points a', b', c' and d') in which the z axis does not extend across the center thereof as the reflection surface. In the shown embodiment, the offset type reflection mirrors are employed.

A relationship of spatial position between respective reflection mirrors is to arrange origins of coordinate systems of respective reflection mirrors defining the shape of the reflection surface on the same plane. Different from the shape of the reflection surface, it is difficult to express the relationship of spatial position by simple relational expression. Therefore, the arrangement position of the reflection mirrors 3a to 3d is determined together with the shape of the reflection surface by a known ray tracing simulation on the basis of the foregoing formulae (1) to (3) for defining the shape of the reflection surface, an incident angle θ of a primary light beam to the image forming element, an approach angle φ of flux of light emitted from the image forming element, spatial restriction of size of the optical system, kind and size of the image forming element (such as liquid crystal display element, DMD or the like) to be combined with the reflection type image forming optical system and design specification of the screen projecting position and so forth.

At this time, angles between the optical axis of the reflection type image forming optical system (A—A axis of FIG. 7A, namely Z axis) and a screen reaching light beam (see FIG. 7), so-called half view angle is to be set greater than or equal to 40 degree and smaller than 90 degree, and the angle of the primary light beam from the image forming element 2 is to be set greater than or equal to 5 degree. When the angle of the primary light beam is smaller than or equal to 5 degree, interference can be caused between the light beam and the illumination optical system to cause eclipse of the light beam. Therefore, it is not desirable to set the angle of the primary light beam to be smaller than or equal to 5 degree. While there is not particular upper limit of the angle of the primary light beam, the upper limit is decided by a size of a progector installing the reflection type image forming optical system. It may be preferred to set the upper limit of the angle of the primary light beam at approximately 20 degree in order to restrict vertical distance between the reflection mirrors for making arrangement compact and achieving down-sizing.

Figure 6:
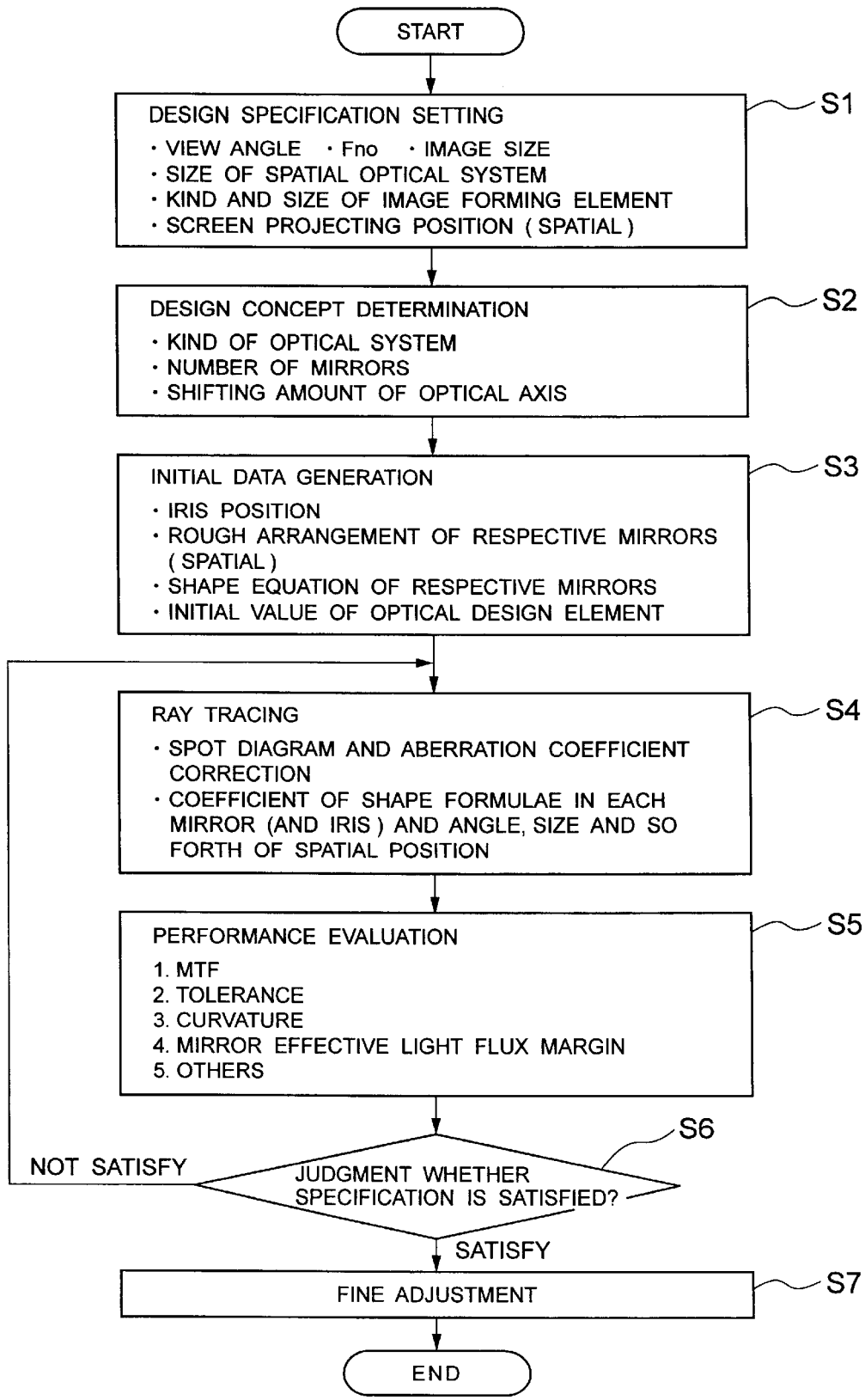
FIG. 6 is a flowchart showing a procedure for determining the shape of reflection mirror and arrangement.

A procedure for deriving the relationship of spatial position between respective reflection mirrors by the ray tracing simulation is illustrated in FIG. 6. At first, the view angle, screen size, spatial size of the optical system, kind and size of the image forming element, design specification, such as screen projecting position and so forth are determined (step S1). Next, on the basis of the design specification, kind of the optical system (whether telecentric system or not; telecentric system is selected in the present invention), number of the reflection mirrors (four in the present invention), design concept, such as optical axis shifting magnitude and so forth are determined (step S2).

On the basis of information determined at steps S1 and S2, initial data, such as iris position, approximate spatial arrangement of the reflection mirrors (arrangement with avoiding partial blocking of the reflected light beam due to mutual interference of respective reflection mirrors), shape determining equation (foregoing formulae (1) to (3) of the present invention) of the reflection mirrors, an initial value of the optical system element necessary for ray tracing and so forth, are generated (step S3). On the basis of the initial data, ray tracing simulation is performed to determined size of respective reflection mirrors, spatial position, tilt angle and so froth. It should be noted that, upon ray tracing simulation, known method is used. The inventors performed ray tracing simulation using a commercially marketed optical system designing software.

In the ray tracing simulation, at first, values of parameters for determining size of respective reflection mirror, spatial position, tilting angle and so forth including ranges of x and y in the foregoing formulae (1) to (3) in ray tracing $\alpha_i$, r, k, are determined (step S4). On the basis of the result of step S4, evaluation is performed for performance, such as MTF, tolerance, curvature, aberration, effective light flux margin of the reflection mirror (step S5). Calculation of parameter and performance evaluation are repeated until the result of evaluation satisfied the design specification to determine shape of the reflection mirror and spatial position by performing fine adjustment (steps S6 and S7).

By optimizing the shapes of respective of four reflection surfaces by the foregoing procedure, preferred shape of the reflection mirror in widening view angle and down-sizing can be obtained in telecentric optical system. One example of the obtained result is shown in FIGS. 7A and 7B.

Figure 7A:
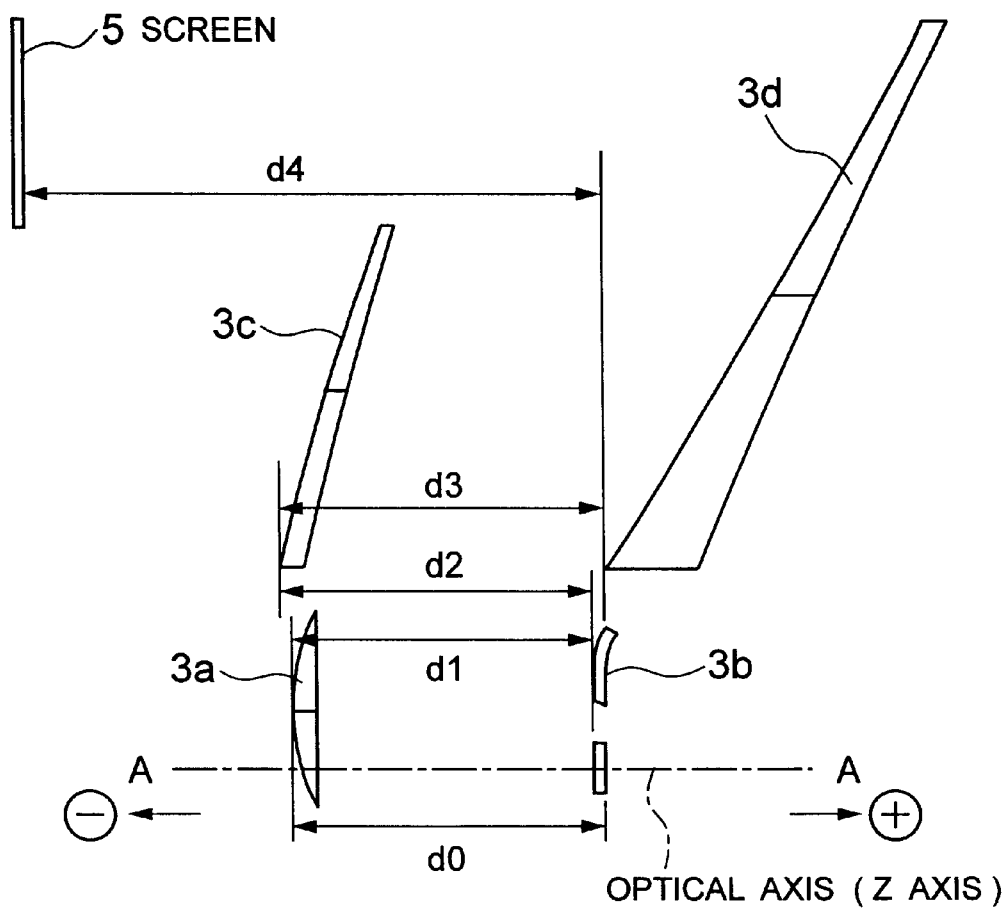

FIG. 7A is an illustration showing arrangement of the reflection mirror and FIG. 7B is an illustration showing particular value of each parameter indicative of the reflection mirror and arrangement thereof.

In FIGS. 7A and 7B, the coordinate system (coordinate axis is expressed by capital letter) consisted of the image forming element 2 and four reflection mirrors 3a to 3d is established with taking the optical axis of the image forming element 2 as Z axis, an axis intersecting with Z axis and perpendicular to the sheet of the drawing as X axis, and an axis (on the sheet) parallel to the sheet of the drawing and perpendicular to Z axis as Y axis. In the drawing, right direction is taken as positive direction of Z axis and left direction is taken as negative direction of Z axis, upward direction is taken as positive direction of Y axis and downward direction is taken as negative direction of Y axis. Also, the direction distal direction toward back side of the sheet is taken as positive direction. Thus, the sheet surface forms the Y-Z plane. Origin of the coordinates may be set at any position. For the purpose of disclosure, an intersection between Z axis and the image forming element is taken as origin of the coordinates.

In FIG. 7B, "No." represents number for identifying the reflection mirror 3a to 3d and the image forming element 2, wherein "0" identifies the image forming element 2, "1" identifies the first reflection mirror 3a, "2" identifies the second reflection mirror 3b, "3" identifies the third reflection mirror and "4" identifies the fourth reflection mirror. "dj" represents a distance between the reflection mirrors. "dj" in the column of the image forming element, namely in the column of No. 0, d0 shown in FIG. 7A indicates a distance from the image forming element 2 to the first reflection mirror 3a. Similarly, in the column of No. 1, namely in the column of the first reflection mirror, dj represents d1 in FIG. 7A and is indicative of the distance from the first reflection mirror 3a to the second reflection mirror 3b. Similarly, in the column of No. 4, namely in the column of the fourth reflection mirror, dj represents d4 in FIG. 7A and is indicative of the distance from the fourth reflection mirror 3a to the screen 5.

In FIGS. 7A and 7B, units of respective parameters, namely curvature radius r of the reflection mirrors 3a to 3d, the distance d0 between the image forming element 2 and the first reflection mirror 3a, the distances d1 to d3 between reflection mirrors, the distance d4 from the fourth reflection mirror 3d to the screen 5, distances X and Y from Z axis (optical axis A—A of the image forming element) to the origins of the coordinates of the reflection mirrors 3a to 3d (origin of the coordinates defining the shape of the reflection mirror, namely origin of the coordinates upon calculating the shape of the reflection mirror), are "mm".

A rotation angle a of the reflection mirrors 3a to 3d is "degree". With taking a position where coordinate axes x, y, z of the coordinate system (coordinate axes are represented by small letter) defining the shape of the reflection surface of the reflection mirror are parallel to respective coordinate axes X, Y, Z (in a condition where y axis is perpendicular to Z axis (optical axis A—A)) as reference, the rotation angle as rotated toward right (clockwise) about x axis is forward or positive and left (counterclockwise) about x axis is reverse or negative. Parameters other than those set forth above (conical coefficient k, correction coefficients $\alpha 1$ to $\alpha 7$) are absolute number.

Distance dj (j=1 to 4, namely, in the drawing, d0, d1, d2, d3, d4) are distances which are measured in parallel to the optical axis A—A (Z axis) between the origins of the coordinates defining the shapes of respective reflection surfaces, namely the distances between origins of the coordinates defining the shapes of respective reflection surfaces on the Z axis. X is distance from the optical axis A—A (Z axis) to the origin of the coordinate defining the shape of each reflection surface, perpendicular to the optical exis A—A (Z axis) in X axis direction. Y is a distance from the optical axis A—A (Z axis) to the origin of the coordinate defining the shape of each reflection surface, perpendicular to the optical axis A—A (Z axis) in Y axis direction.

In the example shown in FIGS. 7A and 7B, since the reflection mirror is offset type, the origin of coordinate of the reflection mirror is located offsetting from the center of the reflection mirror. Since the distance dj (j=0 to 4) may be required only relative Z coordinate of the origin of respective coordinates defining the shape of respective reflection surfaces, positions of X coordinate and Y coordinate are not clearly shown while position of the Z coordinate of the origin of respective coordinates defining the shapes of respective reflection surface is shown.

While the reflection mirror 3d is rotated toward left, in relation to the shape of the reflection surface of the offset type, it is illustrated as rotated toward right nominally. Size of the reflection mirror is arbitrary and can be set at a size not blocking the light beam in the relationship of the position of the foregoing reflection mirror.

The illumination optical system 1 is constructed with a light source consisted of an arc lamp 1a and a elliptic mirror 1j, in which a light emitting portion of the arc lamp 1a is arranged at a first focal point, a rod lens 1c having an incident side opening arranged at the second focal point of the elliptic mirror 1j, a color filter 1b arranged between the light source and the rod lens 1c, lenses 1d, 1f, 1g and 1h arranged in alignment with the center of light emitting side of the rod lens 1c, and a plane reflection mirror (so-called optical path converting element) 1i for reflecting the flux of light to guide to the image forming surface. With respect to the reflection type image forming optical system, the image forming surface of the illumination optical system 1 is arranged matching with the image forming surface of the reflection type image forming optical system. On the image forming surface of the illumination optical system 1, the reflection type image forming element 2 is installed to form a telecentric illumination optical system. The reflection type image forming element 2 is formed with the reflection type liquid crystal light bulb or DMD, and is arranged at the image forming position common to the illumination optical system 1 and the reflection type image forming optical system. In the shown embodiment DMD is employed.

The flux of light emitted from the arc lamp 1a is focused to the incident side opening of the rod lens 1c by the elliptic mirror 1j to be incided to the rod lens 1c. Then, the flux of light becomes an enlarged flux of light with maintaining illumination intensity distribution at the emitting end of the rod lens 1c by the lenses 1d, 1f, 1g, 1h. The enlarged flux of light is reflected by the plane reflection mirror 1i and incide to the reflection type image forming element 2 arranged on the image forming surface of the illumination optical system 1 (also the image forming surface of the reflection type image forming optical system) with deflecting the propagating direction.

The flux of light guided to the reflection type image forming element 2 by the illumination optical system is reflected by the reflection type image forming element as spatially modulated into light intensity distribution depending upon the image to incide to the reflection type image forming optical system. The flux of light incided to the reflected type image forming optical system is sequentially reflected and enlarged by the first reflection mirror 3a, the second reflection mirror 3b, the third reflection mirror 3c and the fourth reflection mirror 3d. The flux of light reflected by the fourth reflection mirror 3d is projected on the projection screen (not shown) in enlarged fashion. At this time, the projected view angle of the projected image is as wide as 140 degree or greater.

Figure 8:
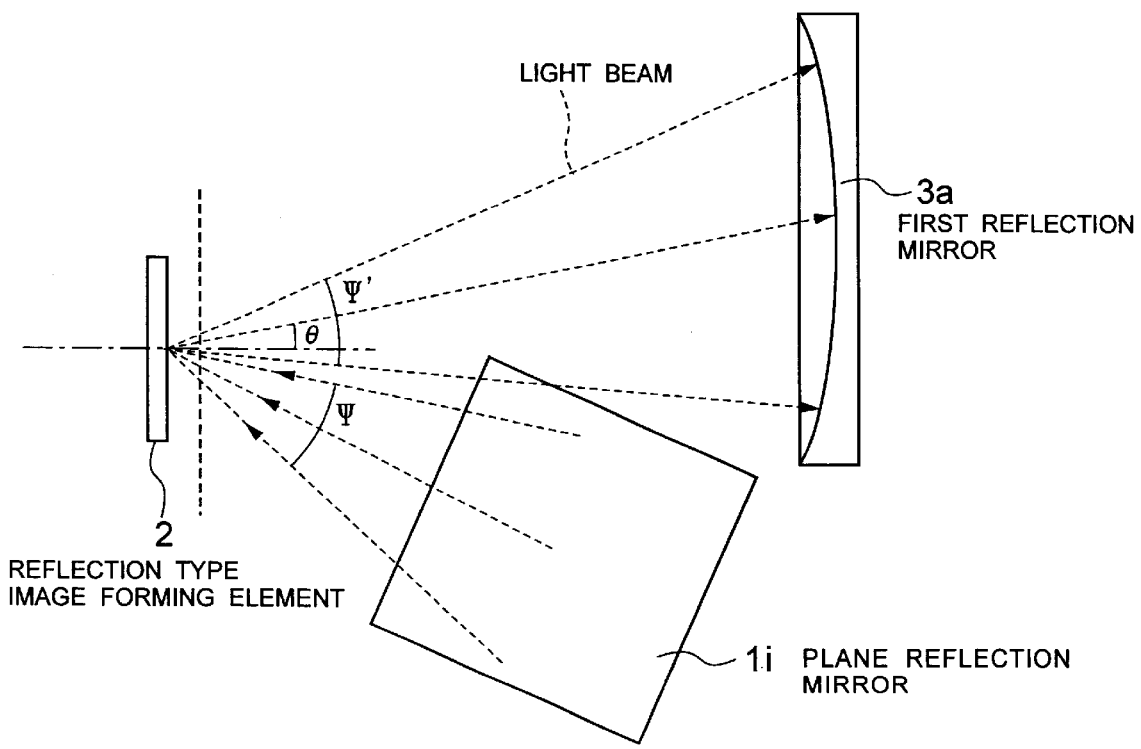
FIG. 8 is a partial enlarged illustration of FIG. 2.

The illumination optical system has a construction of telecentric optical system, and the reflection type image forming optical system is also the telecentric optical system. The telecentric flux of light has a predetermined angle θ relative to the normal of the reflection type image forming element 2 as shown in FIG. 8. The flux of light having an approach angle Ψ of the flux of light with respect to the flux of light of the primary light beam (normally correspond to NA and FNO) is incided to the reflection type image forming element 2. Upon reflecting, by providing angle θ for the primary light beam relative to the normal of the reflection type image forming element 2, interference with the optical part of the illuminating portion can be avoided to permit formation of the optical system without causing eclipse or the like. On the other hand, by eliminating the luminance fluctuation in the projection screen by forming the illumination optical system 1 with the telemetric system, illumination efficiency can be improved. Furthermore, the display apparatus, such as projector or the like can be formed with the same reflection type image forming optical system either in transmission type or reflection type.

In the reflection type image forming optical system, the flux of the light has the primary light beam angle θ, in general, sectorial distortional aberration can be inherently caused to narrow in the lower side of the projection screen and widen in the upper side. Furthermore, this tendency is more significant in widening view angle. The present invention improves distortional aberration with a construction of four reflection mirrors respectively having rotation symmetric aspheric shape to whereby to reduce requirement for precision in machining of respective reflection mirrors by using the rotation symmetric aspheric shape reflection mirrors for improving shortcoming of the telecentric optical system to make respective optical parts relatively bulky and to make expensive. Even with relatively large reflection mirror, it becomes possible to produce the reflection mirror of resin material to lower production cost. On the other hand, since the reflection surface is formed into the rotation symmetric aspheric shape, distances between respective reflection mirrors can be made as small as less than or equal to 150 mm to contribute to make the apparatus compact.

As applied to the projector, it becomes necessary to consider influence from the light source. Therefore, particularly in the reflection mirror 3b in FIG. 1, since it is arranged in the vicinity of the reflection type image forming element 2, it may be easily influenced by heat. Therefore, in order to restrict distortion of the image, it is preferred that a linear expansion coefficient α of the material is restricted to satisfy:

$$\alpha < 6 \times 10^{-5}$$

Figure 9:
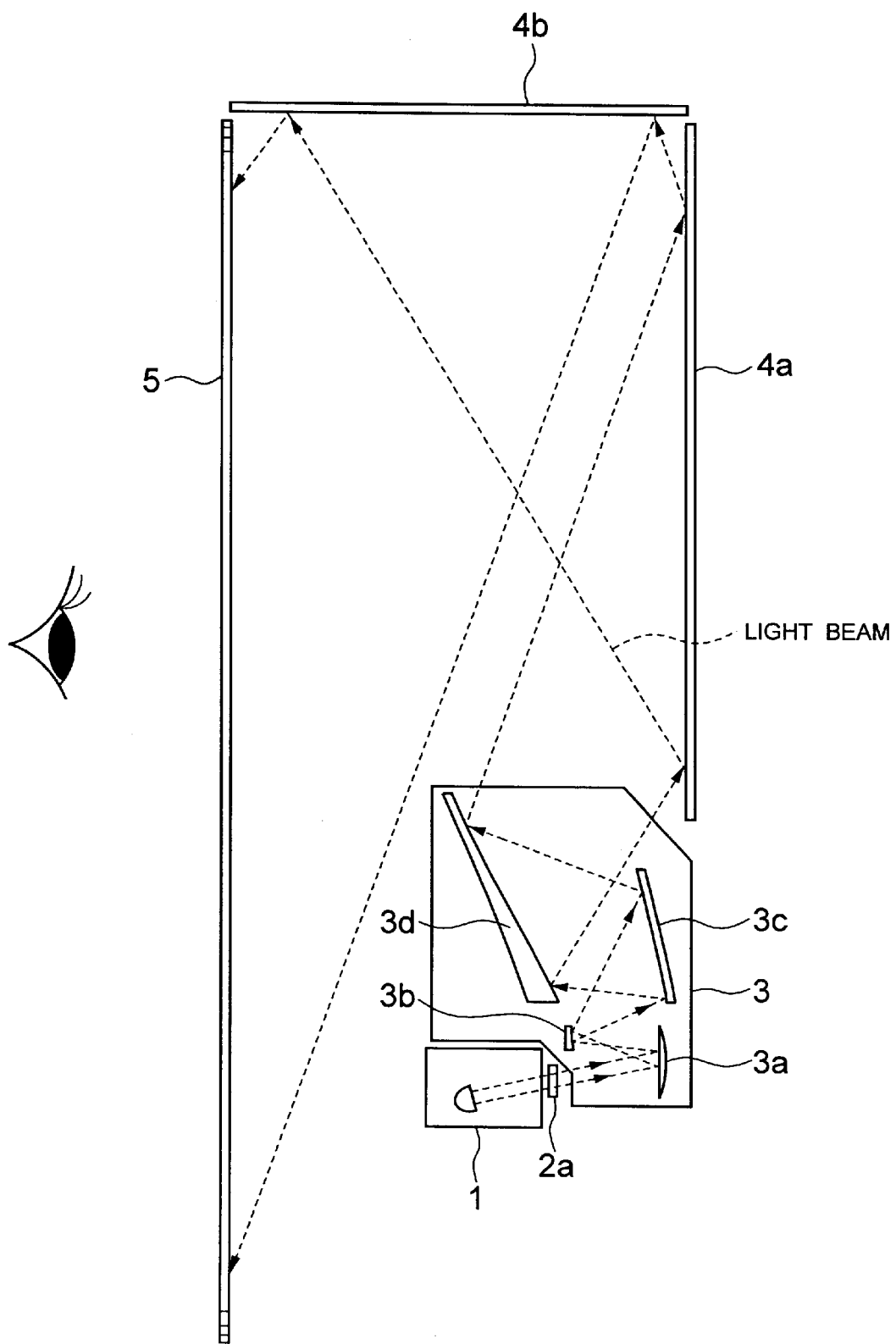
FIG. 9 is a general illustration in which the reflection type image forming optical system of the present invention is applied to a rear projector.
Figure 10:
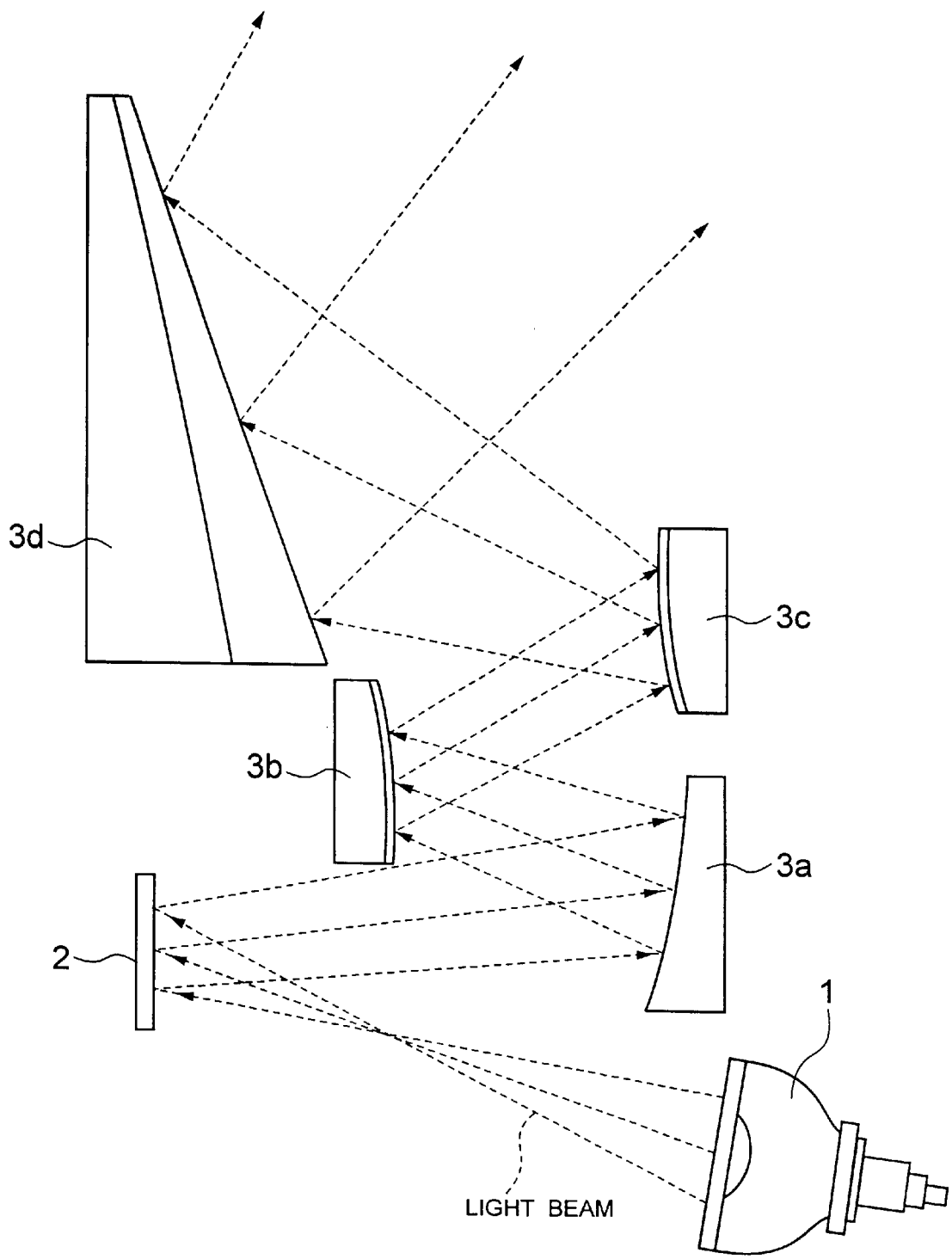
FIG. 10 is a general illustration showing the conventional reflection type image forming optical system.

An example of a back projection type display apparatus employing the reflection type image forming optical system according to the present invention is shown in FIG. 9. The back projection type display apparatus of FIG. 9 is constructed with the illumination optical system 1, a transmission type image forming element 2a, a reflection type image forming optical system 3, plane reflection mirrors 4a and 4b and a transmission type screen 5. The illumination optical system 1, the transmission type image forming element 2a and the first reflection mirror 3a of the reflection type image forming optical system 3 are arranged in alignment. Also, the transmission type image forming element 2a is arranged on the image forming surface of the reflection type image forming optical system. The illumination optical system 1 is a typical telecentric liquid crystal illumination optical system using a fly eye lens (not shown).

A flux of light emitted from the light source lamp of the illumination optical system 1 maintains telecentric characteristics to incide to the transmission type image forming element 2a represented by the transmission type liquid crystal light bulb. The flux of light passed through the transmission type image forming element 2a incides to the reflection type image forming optical system 3 according to the present invention with maintaining approach angle relative to the primary light beam. The reflection type image forming optical system 3 is constructed with the four reflection mirrors 3a to 3d respectively having rotation symmetric aspheric shape shown in FIG. 1. The flux of light emitted from the reflection type image forming optical system 3 has wide view angle with uniform illumination intensity. The flux of light emitted from the reflection type image forming optical system 3 is reflected by the plane reflection mirror 4a reflection surface of which is perpendicularly arranged and is opposed to the reflection mirror 3d on emission side of the reflection type image forming optical system 3 and the plane reflection mirror 4b arranged horizontally above the plane reflection mirror 4a with downwardly directing the reflection surface (arranged perpendicularly to the plane reflection mirror 4a), in sequential order to be projected on the transmission type screen 5 arranged in parallel to the plane reflection mirror 4a, in enlarged form.

As shown in FIG. 9, when the transmission type screen 5 and the plane reflection mirrors 4a and 4b are arranged with respect to the reflection type image forming optical system according to the present invention, enlarged projection on the transmission type screen 5 can be performed with spatially small space. Particularly, by arranging and constructing the plane reflection mirror 4b in parallel to the normal of the image forming element 2a, overall apparatus can be concealed from a view filed of the observer watching the transmission type screen 5. On the other hand, using the illumination optical system 1 having the plane reflection mirror as shown in FIG. 1 is advantageous for requiring smaller depth.

While the foregoing embodiments employ the rotation symmetric aspheric shape concave mirror as the third reflection mirror 3c, similar effect can be obtained even in the case where the rotation symmetric aspheric shape convex mirror is employed as the third reflection mirror 3c.

The reflection type image forming optical system according to the present invention can realize wide view angle with simple construction of four reflection mirrors, wherein only reflection mirrors of rotation symmetric aspheric shape are employed. On the other hand, distances between respective reflection mirrors can be made small to achieve downsizing. Furthermore, by employing rotation symmetric aspheric shape in the four reflection mirrors to be easily machined, those reflection mirrors may be formed of a resin to produce inexpensive reflection type image forming optical system.

Furthermore, since telecentric type optical system is employed, reduction of illumination intensity fluctuation and improvement of illumination efficiency can be achieved to construct the compact and inexpensive display apparatus which can illuminate uniform illumination intensity.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A reflection type image forming optical system comprising:
    a first reflection mirror having a rotation symmetric aspheric shape concave reflection surface directed to an image forming surface arranged an image forming element thereon;
    a second reflection mirror having a rotation symmetric aspheric shape convex reflection surface directed toward a flux of light from said first reflection mirror;
    a third reflection mirror having a rotation symmetric aspheric shape concave reflection surface directed toward a flux of light from said second reflection mirror; and
    a fourth reflection mirror having a rotation symmetric aspheric shape convex reflection surface directed toward a flux of light from said third reflection mirror;
    said first, second, third and fourth reflection mirrors forming a telecentric optical system.

2. A reflection type image forming optical system comprising:
    a first reflection mirror having a rotation symmetric aspheric shape concave reflection surface directed to an image forming surface arranged an image forming element thereon;
    a second reflection mirror having a rotation symmetric aspheric shape convex reflection surface directed toward a flux of light from said first reflection mirror;
    a third reflection mirror having a rotation symmetric aspheric shape convex reflection surface directed toward a flux of light from said second reflection mirror; and
    a fourth reflection mirror having a rotation symmetric aspheric shape convex reflection surface directed toward a flux of light from said third reflection mirror;
    said first, second, third and fourth reflection mirrors forming a telecentric optical system.

3. A reflection type image forming optical system as set forth in claim 1, wherein the shapes of the reflection surfaces of the reflection mirrors forming said reflection type image forming optical system satisfies the following formulae (1) to (3) taking an optical axis as z axis, a plane perpendicular to the z axis as x-y plane, an intersection between the z axis and the x-y plane as origin O, and axes intersecting at the origin O, extending on the x-y plane and perpendicularly intersecting with each other as x axis and y axis:

$$z = \frac{c\rho^2}{1 + \sqrt{1 - (1+k)c^2\rho^2}} + \sum_{i=1}^{8} \alpha_i \rho^{2i} \quad (1)$$

$$\rho^2 = x^2 + y^2 \quad (2)$$

$$c = 1/r \quad (3)$$

wherein $\alpha_i$ (i=1, 2, ..., 8) are correction coefficients, r is a curvature radius of the reflection surface and k is conical coefficient.

4. A projector comprising:
    a telecentric illumination optical system having a light source and an image forming optical system;
    a reflection type image forming element arranged on an image forming surface of said telecentric illumination optical system; and
    a telecentric reflection type image forming optical system locating an image forming surface at an arrangement position of said reflection type image forming element and reflecting and projecting a flux of light reflected by said reflection type image forming element on a screen, said reflection type image forming optical system including;
    a first reflection mirror having a rotation symmetric aspheric shape concave reflection surface directed to an image forming surface arranged an image forming element thereon;
    a second reflection mirror having a rotation symmetric aspheric shape convex reflection surface directed toward a flux of light from said first reflection mirror;

a third reflection mirror having a rotation symmetric aspheric shape concave reflection surface directed toward a flux of light from said second reflection mirror; and a fourth reflection mirror having a rotation symmetric aspheric shape convex reflection surface directed toward a flux of light from said third reflection mirror.

5. A projector comprising:

a telecentric illumination optical system having a light source and an image forming optical system;

a reflection type image forming element arranged on an image forming surface of said telecentric illumination optical system; and a telecentric reflection type image forming optical system locating an image forming surface at an arrangement position of said reflection type image forming element and reflecting and projecting a flux of light reflected by said reflection type image forming element on a screen, said reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from said first reflection mirror;

a third reflection mirror having a rotation symmetric aspheric shape convex reflection surface directed toward a flux of light from said second reflection mirror; and a fourth reflection mirror having a rotation symmetric aspheric shape convex reflection surface directed toward a flux of light from said third reflection mirror.

6. A projector comprising:

a telecentric illumination optical system having a light source and an image forming optical system;

a transmission type image forming element arranged on an image forming surface of said telecentric illumination optical system; and a telecentric reflection type image forming optical system locating an image forming surface at an arrangement position of said transmission type image forming element and reflecting and projecting a flux of light passed through said transmission type image forming element on a screen, said reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from said first reflection mirror;

a third reflection mirror having a rotation symmetric aspheric shape concave reflection surface directed toward a flux of light from said second reflection mirror; and a fourth reflection mirror having a rotation symmetric aspheric shape convex reflection surface directed toward a flux of light from said third reflection mirror.

7. A projector comprising:

a telecentric illumination optical system having a light source and an image forming optical system;

a transmission type image forming element arranged on an image forming surface of said telecentric illumination optical system; and a telecentric reflection type image forming optical system locating an image forming surface at an arrangement position of said transmission type image forming element and reflecting and projecting a flux of light passed through said transmission type image forming element on a screen, said reflection type image forming optical system including;

a first reflection mirror having a rotation symmetric aspheric shape concave reflection surface directed to an image forming surface arranged an image forming element thereon;

a second reflection mirror having a rotation symmetric aspheric shape convex reflection surface directed toward a flux of light from said first reflection mirror;

a third reflection mirror having a rotation symmetric aspheric shape convex reflection surface directed toward a flux of light from said second reflection mirror; and a fourth reflection mirror having a rotation symmetric aspheric shape convex reflection surface directed toward a flux of light from said third reflection mirror.

8. A projector as set forth in claim 4, wherein the shapes of the reflection surfaces of the reflection mirrors forming said reflection type image forming optical system satisfies the following formulae (1) to (3) taking an optical axis as z axis, a plane perpendicular to the z axis as x-y plane, an intersection between the z axis and the x-y plane as origin O, and axes intersecting at the origin O, extending on the x-y plane and perpendicularly intersecting with each other as x axis and y axis:

$$z = \frac{c\rho^2}{1 + \sqrt{1 - (1+k)c^2\rho^2}} + \sum_{i=1}^{8} \alpha_i \rho^{2i} \quad (1)$$

$$\rho^2 = x^2 + y^2 \quad (2)$$

$$c = 1/r \quad (3)$$

wherein $\alpha_i$ (i=1, 2, ..., 8) are correction coefficients, r is a curvature radius of the reflection surface and k is conical coefficient.

9. A projector as set forth in claim 4, wherein said illumination optical system has a light path converting element.

* * * * *